United States Patent [19]

Penrice

[11] Patent Number: 5,266,142
[45] Date of Patent: Nov. 30, 1993

[54] COATED PISTON AND METHOD AND APPARATUS OF COATING THE SAME

[75] Inventor: Thomas J. Penrice, Reading, Pa.

[73] Assignees: DECC Technology Partnership a limited partnership, Grand Rapids, Mich.;

[21] Appl. No.: 786,772

[22] Filed: Nov. 1, 1991

[51] Int. Cl.$^5$ .............................................. B41F 16/00
[52] U.S. Cl. ..................... 156/240; 101/41; 101/163; 123/193.6
[58] Field of Search ............... 156/230, 240; 101/41, 101/150, 153, 163, 170, 193; 118/212; 123/193.6; 252/12; 92/223

[56] References Cited

U.S. PATENT DOCUMENTS

| | | | |
|---|---|---|---|
| 1,975,818 | 10/1984 | Work | 204/13 |
| 3,295,198 | 1/1967 | Coan | 29/527 |
| 3,916,784 | 11/1975 | Dubuit | 101/41 |
| 4,060,031 | 11/1977 | Phillipp | 101/163 |
| 4,131,982 | 2/1982 | Miura | 427/428 |
| 4,321,308 | 3/1982 | Jahnke | 428/469 |
| 4,395,442 | 7/1983 | Meise et al. | 427/236 |
| 4,545,301 | 10/1985 | Reinhold | 101/163 |
| 4,683,821 | 8/1987 | Berberich | 101/170 |
| 4,723,485 | 2/1988 | Berberich et al. | 101/44 |
| 4,814,204 | 3/1989 | Carey et al. | 427/286 |
| 4,831,977 | 5/1989 | Presswood | 123/193 P |
| 4,832,983 | 5/1989 | Nagatomi et al. | 427/81 |
| 4,871,593 | 10/1989 | McIntyre | 427/428 |
| 4,892,760 | 1/1990 | Nishiyama | 427/428 |
| 4,932,352 | 6/1990 | Huvey et al. | 118/202 |
| 4,986,231 | 1/1991 | Brown | 123/193 P |
| 4,987,014 | 1/1991 | Woodward et al. | 427/278 |
| 4,987,865 | 1/1991 | Schenkei | 123/193 P |
| 4,997,024 | 3/1991 | Cole et al. | 164/75 |

FOREIGN PATENT DOCUMENTS 2163073A 9/1984 United Kingdom .

OTHER PUBLICATIONS

Tampoprint Brochure on Tampoprinting Machines, pp. 1–26, Oct. 1987.

*Primary Examiner*—David A. Simmons
*Assistant Examiner*—James J. Engel, Jr.
*Attorney, Agent, or Firm*—Price, Heneveld, Cooper, DeWitt & Litton

[57] ABSTRACT

A piston with piston skirt dry film lubricant coat applied by the transfer pad process to lessen the stresses associated with reciprocating engine parts and method for applying such a coat to the skirt of a piston. Wetted dry film lubricants are diluted with volatile solvents to create a wetted dry film lubricant of liquid consistency in order to make the dry film lubricants adaptable to the transfer pad coating process. Application of the wetted dry film lubricant to the piston by the transfer pad coating process provides for the precise and discriminant application of dry film lubricants to piston skirts thereby providing a less costly coated piston by avoiding the time-consuming task of masking the pistons prior to application of a wetted dry film lubricant by the currently used spray method and eliminating the waste and pollution problems associated with the spray method.

16 Claims, 4 Drawing Sheets

COATED PISTON AND METHOD AND APPARATUS OF COATING THE SAME

BACKGROUND

This invention relates to a piston having a defined dry film lubricant coated surface and to a process and apparatus of coating a defined surface of a piston with a dry film lubricant.

It will be appreciated that during operation of an engine having reciprocating engine parts which involve frictionally engaging piston and cylinder members, surface portions of the pistons are exposed to enormous stresses and experience high sliding speeds. These stresses generally result in the wearing of materials and deterioration during the operation of the piston-cylinder devices. It has been proposed heretofore that a wear resistant dry lubricant film be bonded to the piston skirts to protect against these stresses and improve engine efficiency.

To form the dry lubricant film on the piston skirt, heretofore a wetted dispersion of the dry film lubricant has been applied by means of a spraying apparatus using a suitably dilute solution of the film lubricant. Such a method, however, requires that all areas of the piston other than the piston skirt be masked or covered to prevent them from being contacted by the lubricant dispersion. Masking of the pistons is quite time-consuming and, therefore, quite costly. Masking also does not always avoid coating undesirable portions of the piston. In addition, the indiscriminate spraying of the piston with lubricant is wasteful and causes pollution problems. Presently, there are no known methods available for precisely and discriminately applying dry film lubricants to piston skirts. The current spray method for application of dry film lubricants to the friction bearing surfaces of pistons are time-consuming, waste lubricant and cause pollution.

SUMMARY OF THE INVENTION

The present invention provides for a piston having certain defined surfaces such as the piston skirt coated by the transfer pad process. It also provides for the method of coating such defined surfaces of a piston with a dry film lubricant by providing a wetted dry film lubricant material and applying it to the defined area by means of a transfer pad process followed by heat curing of the wetted lubricant material. I have discovered that dry film lubricants dispersed in an organic resin and a volatile solvent form a wetted dry film lubricant of liquid consistency and high volatility, characteristics which allow application of the wetted dry film lubricant to the defined surfaces by the transfer pad process. Application of the wetted dry film lubricant to the piston by the transfer pad process provides for the precise and discriminant application of dry film lubricants to the defined area of the piston thus providing a superior piston on which only the defined areas are coated and further avoiding the time-consuming task of masking the pistons prior to application of a wetted dry film lubricant by spraying as well as eliminating the waste and pollution problems associated with the spray method.

BRIEF DESCRIPTION OF THE FIGURES

FIGS. 4 A-L, inclusive, illustrate a first embodiment of apparatus and a series of steps of a process for performing the present invention;

FIGS. 8 A-F, inclusive, illustrate a second embodiment of a apparatus and a series of steps of a process for performing the present invention.

DESCRIPTION OF THE PREFERRED EMBODIMENT

In the decorative arts industry, a process known as transfer pad printing has been developed to apply printing inks to select areas of a workpiece. The first step in the process involves etching a negative of the image to be imprinted, or intaglio, into a stainless steel plate matrix also known as a cliche. The matrix is then inked and a doctor blade scraped over it to remove excess ink so that only the etched grooves retain ink. A printing pad is then pressed upon the matrix to take up the ink and the pad transfers it to the substrate.

U.S. Pat. No. 4,060,031 to Philipp, which is herein incorporated by reference, discloses an example of one printing transfer pad apparatus and method where the transfer pad, or tampon, is made of an elastomeric resilient silicone rubber. Silicone rubber is preferred as the material for the tampon because the silicone rubber picks up the ink from the matrix and delivers it to the printed surface. This attribute of silicone rubber facilitates the delivery of nearly all of the ink from the matrix to the workpiece with little or no residual ink on the tampon. This reduces the maintenance of the tampon and assures that the desired amount of ink is transferred to the workpiece. As illustrated in the '031 patent, these characteristics of silicone rubber have facilitated the mechanization of the transfer pad printing process.

I have conceived of utilizing the transfer pad process for coating a piston with a dry film lubricant to produce a dry film lubricant coated piston and to produce an improved and advantageous method of coating a piston.

Normally in coating a defined area of a piston with a dry film lubricant by the spray method previously referred to, a solid lubricant is mixed with a resin and dispersed in an appropriate solvent. For example, a solid lubricant, such as the fluoropolymer known as Teflon TM (polytetrafluoroethylene or PTFE), graphite or molybdenum disulfide is mixed into a polymer (plastic) resin. This mixture is then diluted with a volatile solvent, which creates a coating of liquid consistency. This coating is then applied to the piston by a spray technique in a wet form. When heated, the volatile solvent evaporates leaving a thin layer of dry solid lubricant tightly bonded by the organic resin to the piston. Such coating materials are offered in a variety of forms by numerous companies including the Acheson Colloids Company of Port Huron, Mich.; Dow Corning, Inc. of Midland, Mich. and E. I. du Pont de Neumors of Wilmington, Del.

I have conceived that any combination of dry film lubricant and resin binder can be modified to be applied by the transfer pad process to a piston through the use of appropriate solvents. To demonstrate this principle, EMRALON TM 334, a PTFE based dry film lubricant available from the Acheson Colloids Company was applied to a piston by the transfer pad coating process. EMRALON TM 334 is supplied in a liquid form containing 28% solids by weight (hence 72% solvent by weight). The solvent in which the 334 product is supplied, however, evaporates too slowly to be effectively used in the transfer pad coating process. Therefore, an amount of the EMRALON TM coating was agitated in an open container to evaporate enough solvent to increase the solids level to 40%. A blend of 80% acetone/20% n-methyl 2-pyrrolidone was then added to the concentrated EMRALON TM to reduce the solids level back to 32%. This resulted in a thicker composition than normally used in the spray method and a composition with a faster evaporation rate.

The modified EMRALON TM was successfully applied to test specimens using equipment manufactured by the Imtran Company of Rowley, Mass. This standard (non-rotary) pad printing equipment is also available from the Designer Plastics Company of Arab, Ala., the Trans-Tech Company of Schaumburg, Ill. and Service Tectonics of Adrian, Mich. Some examples of the type of pad coating equipment which could be used to apply the wetted dry film lubricant material to a defined area of a piston are illustrated by the sketches in FIGS. 4A through 4L, inclusive, and 8A through 8F, inclusive. FIGS. 1, 2, 3, 5, 6 and 7 illustrate a coated piston and a mechanism which can be used to support and rotate the piston during the coating process to allow coating lubricant on two defined curved surface areas of the piston which are diametrically opposite one from the other.

Figure 1:
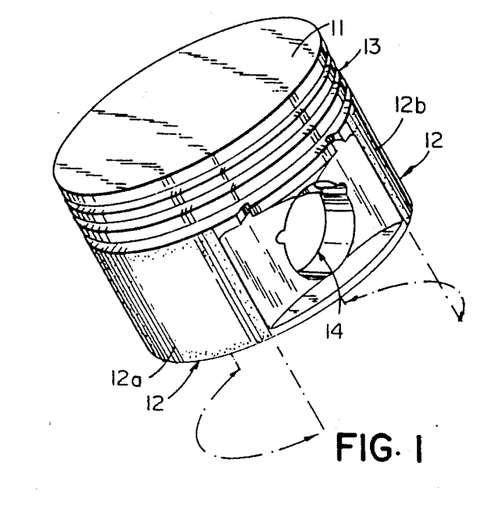
FIG. 1 is a perspective view of a piston with a skirt coated with a dry film lubricant by a transfer pad coating process.
Figure 2:
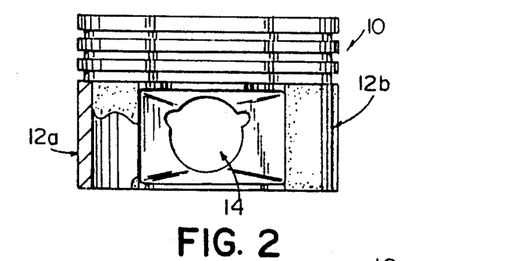
FIG. 2 is a side elevational view of the piston of FIG. 1.
Figure 3:
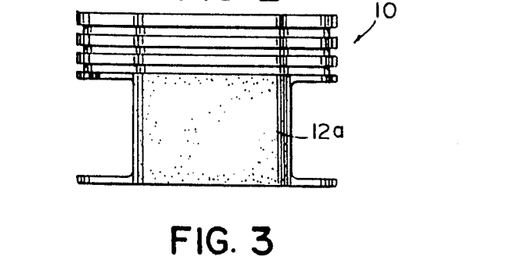
FIG. 3 is a side elevational view of FIG. 2 rotated 90°.

Referring now to the drawings and the embodiments illustrated therein, in which like numerals indicate like parts throughout the several views, and with specific reference to FIGS. 1, 2 and 3, a piston 10 is provided which has a crown 11 and an outer curved surface area comprising the piston skirt 12 which is subjected to frictional contact with an inner surface of a cylinder (not shown) and the ring band 13 having grooves 13a for receiving piston rings (not shown). Piston skirt 12 has two curved surface areas 12a and 12b which are diametrically opposite from one another. Piston 10 also has a pair of diametrically opposite wrist pin openings 14. Because piston skirt 12 has two curved surface areas 12a and 12b, each of which need coating with dry lubricant, a support mechanism 15 is provided to support and rotate piston 10 so as to sequentially locate each skirt area 12a and 12b in a position for applying the wetted dry film lubricant by the transfer pad coating process.

Figures 5, 6, 7:
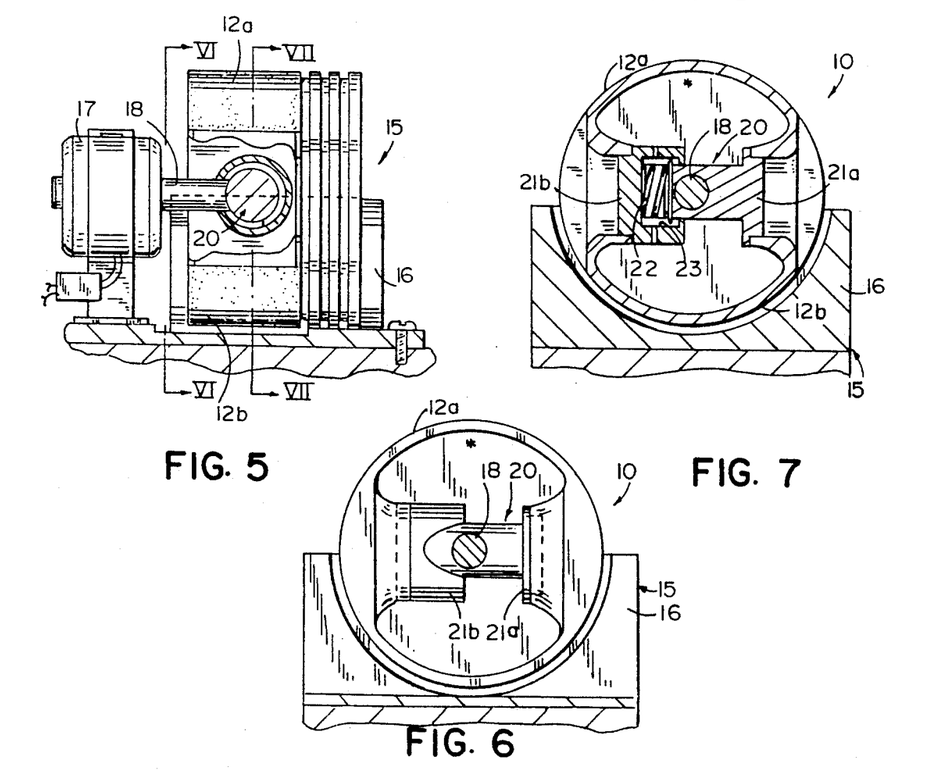
FIG. 5 is a side elevational view illustrating one apparatus for supporting the piston while it is being coated and for rotating it so that opposite sides of its skirt can be alternately coated.
FIG. 6 is a cross-sectional view taken along the plane VI—VI of FIG. 5.
FIG. 7 is a cross-sectional view taken along the plane VII—VII of FIG. 5 illustrating the internal construction of the apparatus for supporting and rotating the piston.

FIGS. 5, 6 and 7 illustrate the support mechanism 15 which includes the cradle 16 on and in which the ring band 13 is supported as the piston 10 is rotated by the motor 17. The piston 10 is connected to the shaft 18 of motor 17 by a biased plunger 20 which includes two ends 21a and 21b shaped to fit into the wrist pin openings 14a and 14b, respectively. End 21b is cup shaped so as to receive spring 22 which is seated in the recess 23 of end 21b and contacts end 21a so as to bias the two ends 21a and 21b apart thereby releasably attaching plunger 20 to piston 10. By attaching plunger 20 within wrist pin openings 14, operation of motor 16 will rotate motor shaft 18 and plunger 20 causing rotation of piston 10. Plunger 20 can be released and withdrawn from within wrist pin openings 14 by compressing ends 21a and 21b against the bias of spring 22.

FIGS. 4A through 4L schematically illustrate the steps of the process of coating a piston by this invention. They disclose in schematic form one embodiment of an apparatus by which the piston is coated with a wetted dry film lubricant. Referring to these figures, piston 10 is shown supported by support mechanism 15 within the cradle 16 as described above in relation to FIGS. 5, 6 and 7. For clarity purposes, motor 17 of FIGS. 5, 6 and 7 is not shown, it being understood that the support mechanism 15 is shown in cross section as disclosed in FIG. 6. Support mechanism 15 and piston 10 are supported in proper position with respect to the tampon transfer machine 30, as will now be described, so that wetted dry film lubricant can be delivered to piston 10.

Figure 4A:
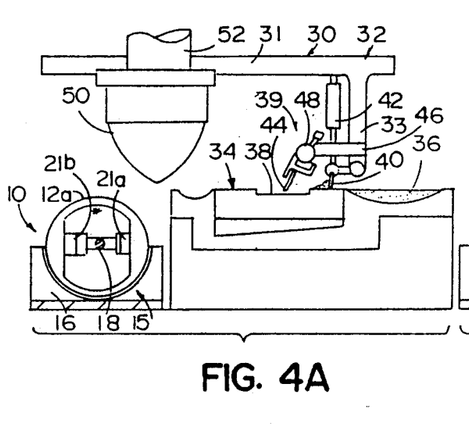

Referring to FIG. 4A, machine 30 includes a machine support 32 having a horizontal arm 31 and a vertical leg 33. Horizontal arm 31 supports a resilient silicone rubber tampon 50, the vertical extension and retraction of which is controlled by a tampon actuator 52. Machine support 32 is movably positioned over a lubricant reservoir 36 and a matrix plate 34 which contains a matrix 38. Vertical leg 33 also provides support for a lubricant spreader mechanism 39 which comprises a spatula 40 and a doctor blade 44. Doctor blade 44 is supported by a doctor blade support arm 46 which extends from vertical leg 33 below and parallel to horizontal arm 31. Doctor blade 44 is selectively lowered into and out of contact with plate 34 by a doctor blade actuator 48 which rotates the doctor blade in and out of position for scraping the matrix 60. Spatula 40 is located above plate 34 and reservoir 36 and is selectively lowered into and out of contact with the lubricant in reservoir 36 and plate 34 by a spatula actuator 42. A first end of spatula actuator 42 is supported by horizontal arm 31 and a second end of spatula actuator 42 is attached to spatula 40 which is pivotally mounted on vertical leg 33. Matrix 38 has a predetermined constant depth in plate 34 which corresponds to the configuration and size of the flat developed pattern of piston skirts 12a and 12b of piston 10.

As shown in FIGS. 4A through 4L, a series of linear movements of machine support 32 are performed to accomplish the transfer of lubricant from reservoir 36 to piston 10. Specifically, the first step in the operation of machine 30 involves the covering of plate 34 with lubricant from reservoir 36. To accomplish this, machine support 32 positions lubricant spreader mechanism 39 over reservoir 36. Spatula actuator 42 then lowers spatula 40 into reservoir 36 to collect a quantity of lubricant this having been accomplished before the step illustrated in FIG. 4A. At this time, doctor blade actuator 48 has pivoted the doctor blade 44 out of contact with plate 34 and reservoir 36.

Figure 4B:
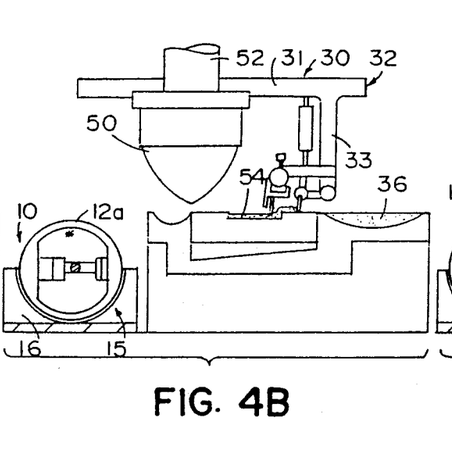

A first linear movement of machine support 32 in a direction to the left as viewed in FIG. 4A causes spatula 40 to spread lubricant previously picked up from reservoir 36 over plate 34. Doctor blade actuator 48 then pivots doctor blade 44 into contact with plate 34 and a second linear movement of machine support 32 to the right moves the lubricant spreader mechanism 39 back into position over reservoir 36 (FIG. 4B). During this second linear movement, doctor blade 44 scrapes over plate 34 removing the excess lubricant on plate 34 which is not in matrix 38 (FIG. 4B). Upon return of lubricant spreader mechanism 39 back into position over reservoir 36, matrix 38 contains a first matrix lubricant layer 54 which contains a predetermined constant depth of lubricant that corresponds to the configuration and size of the flat developed pattern of piston skirts 12a and 12b of piston 10.

The next step in the operation of machine 30 is to pick up the lubricant layer 54 from matrix 38 for transferring it to piston 10. This is accomplished by moving support 32 to the left to position tampon 50 over the lubricant layer 54 in matrix 32. At the time machine support 32 positions tampon 50 over lubricant 54, spatula 40 is positioned over reservoir 36 and is lowered into the lubricant in reservoir 36 to collect a quantity of lubricant from reservoir 36. As disclosed in FIG. 4C, tampon actuator 52 extends tampon 50 into contact with the first matrix lubricant layer 54 causing first matrix lubricant layer 54 to adhere to tampon 50. Tampon 50 is then moved into position over piston 10 during the first linear movement of machine support 32 (FIG. 4D). Tampon actuator 52 then extends tampon 50 into contact with piston 10 to transfer first tampon lubricant layer 54 to piston skirt 12a, piston skirt 12a being properly positioned within cradle 16 by support mechanism 15 (FIG. 4E). Tampon actuator 52 then retracts tampon 50 leaving a first lubricant coating 54 attached to piston skirt 12a (FIG. 4F).

Figure 4C:
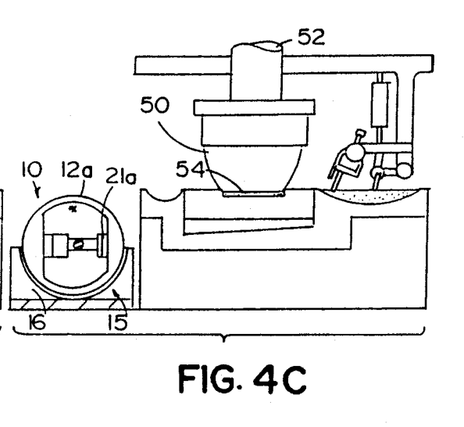
Figure 4D:
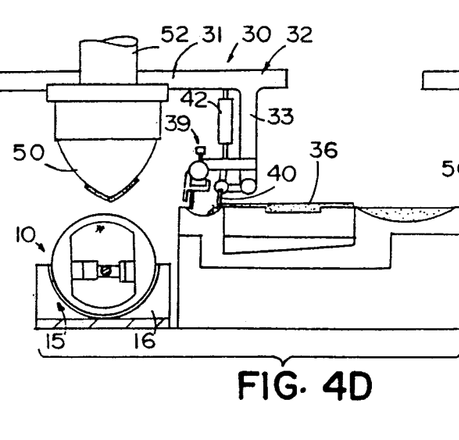
Figure 4E:
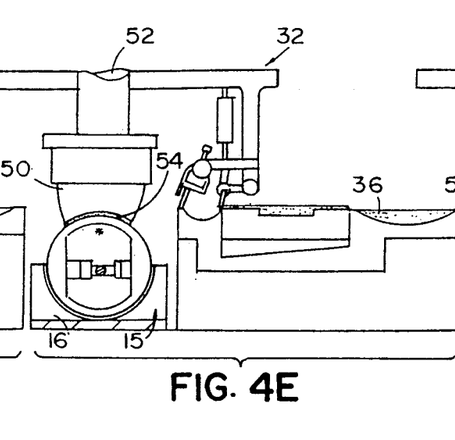
Figure 4F:
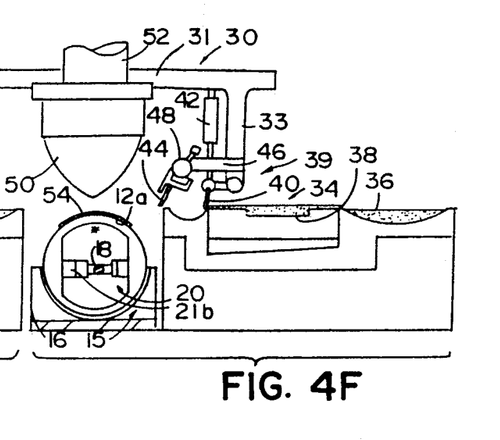
Figure 4G:
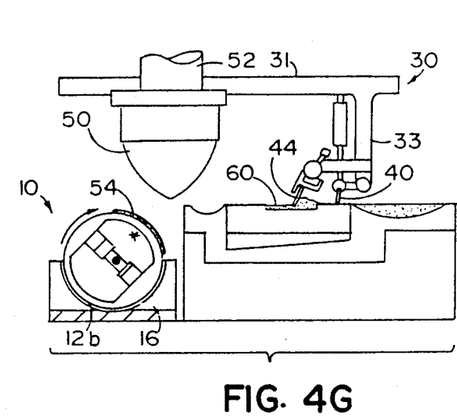

During the movement of tampon 50 to the left, spatula 40 fills the matrix 38 with lubricant it had previously picked up while the tampon 50 was in the position of FIG. 4C.

Figure 4H:
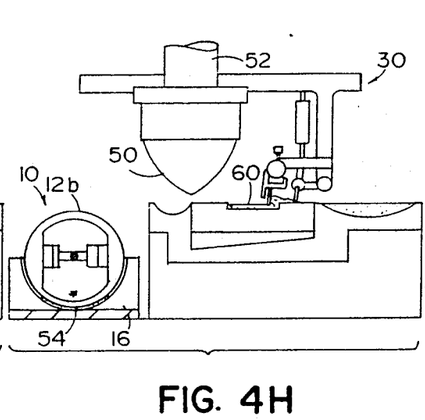

As machine support 32 begins its second linear movement to the right as viewed in FIG. 4G, doctor blade 44 again scrapes off the excess lubricant which previously had been spread over matrix 34 by spatula 40. This forms a second matrix lubricant layer 60 (FIG. 4H) which contains a predetermined constant depth of lubricant that corresponds to the configuration and size of the flat developed pattern of piston skirts 12a and 12b of piston 10. Also, during this time, piston support mechanism 15 is rotating piston 10 (FIG. 4G) 180 degrees to properly position piston skirt 12b within cradle 16 for application of the second lubricant film 60 (FIG. 4H). The linear movement of machine support 32 to the right again moves tampon 50 over matrix 38 and subsequent actuation of tampon actuator 52 again extends tampon 50 into contact with the second matrix lubricant layer 60 causing second matrix lubricant layer 60 to adhere to tampon 50 (FIG. 4I).

Figure 4I:
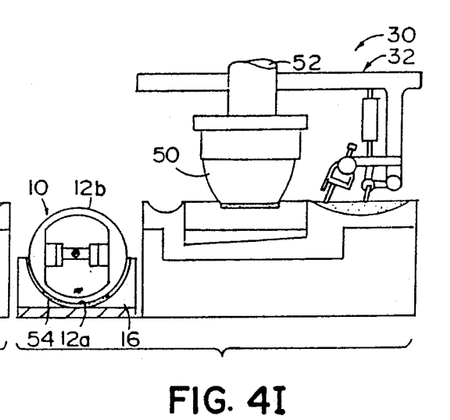
Figure 4J:
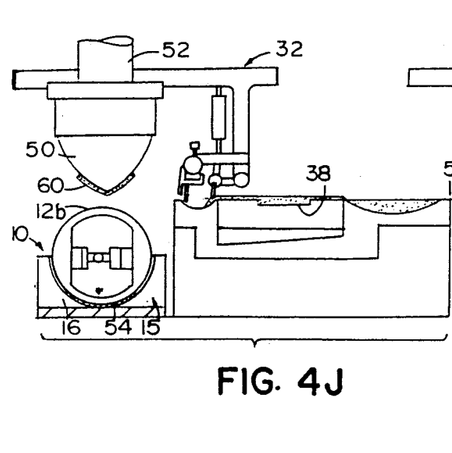
Figure 4K:
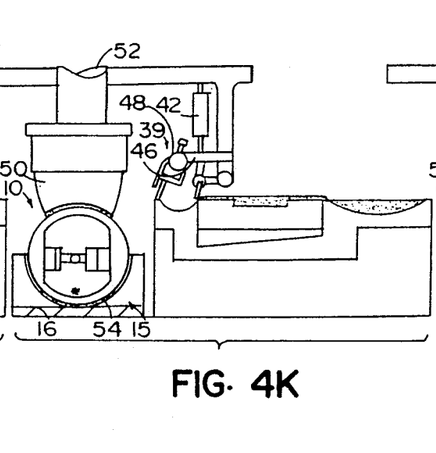
Figure 4L:
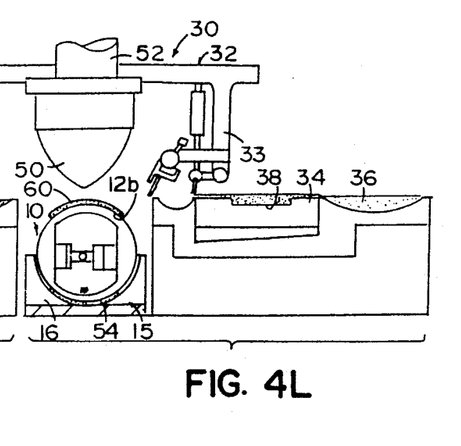

Subsequent movement of support 32 moves tampon 50 into position over piston 10 (FIG. 4J). Then, as disclosed in FIG. 4K, tampon actuator 52 extends tampon 50 into contact with piston 10 to transfer second tampon lubricant layer 60 to piston skirt 12b which had been properly positioned within cradle 16 by support mechanism 15 (FIG. 4K). Tampon actuator 52 then retracts tampon 50 leaving second lubricant film coating 60 attached to piston skirt 12b (FIG. 4L). With the completion of the coating of piston 10 with lubricant, piston 10 is removed from piston support mechanism 15 and a new piston 10 is placed in position on piston support mechanism 15.

It should be understood that during the movements of tampon 50 as above-described in relation to FIGS. 4I through 4L, inclusive, lubricant spreader mechanism 39 is returned into position over reservoir 36, as disclosed in FIG. 4I, and spatula actuator 42 again lowers spatula 40 into reservoir 36 to collect a quantity of lubricant, which is deposited in the matrix 38. Subsequently, the new piston placed in support mechanism 15 undergoes the same steps of operation as represented by FIGS. 4B through 4L, inclusive.

FIGS. 8A through 8F also schematically illustrate another apparatus and steps of the process of coating a piston by this invention. They disclose in schematic form a second embodiment of an apparatus by which the piston is coated with a wetted dry film lubricant. Referring to these figures, piston 10 is shown supported by support mechanism 15 within the cradle 16 as described above in relation to FIGS. 5, 6 and 7. For clarity purposes, motor 17 of FIGS. 5, 6 and 7 is not shown, it being understood that the support mechanism 15 is shown in cross section as disclosed in FIG. 6. A support lever 19 alternately moves support mechanism 15 and piston 10 into proper position with respect to the tampon transfer machine 130, as will now be described, so that wetted dry film lubricant can be delivered to piston 10.

Machine 130 includes a fixed machine support 132 having a back support plate 131 and an under support plate 133. Machine support 130 also supports a lubricant reservoir 136 and supports a rotary cylindrical matrix plate 134 containing a matrix 138. Machine support 132 also provides support for a doctor blade 144 which is in continuous contact with cylindrical matrix plate 134. Matrix 138 has a predetermined constant depth in plate 134 which corresponds to the configuration and size of the piston skirts 12a and 12b of piston 10. A rotary cylindrical resilient silicone rubber tampon 150 is in continuous contact with matrix plate 134.

Figure 8A:
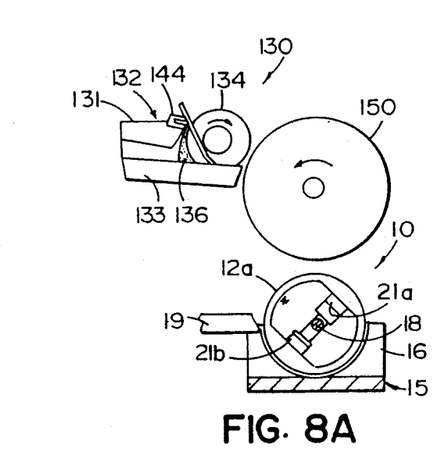
Figure 8B:
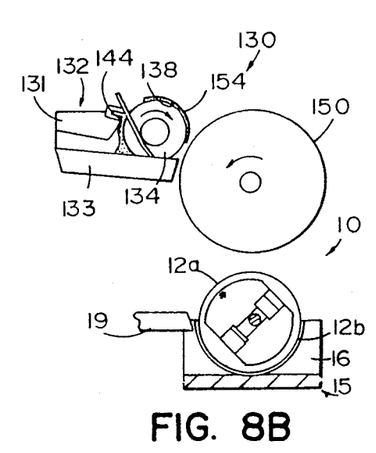
Figure 8C:
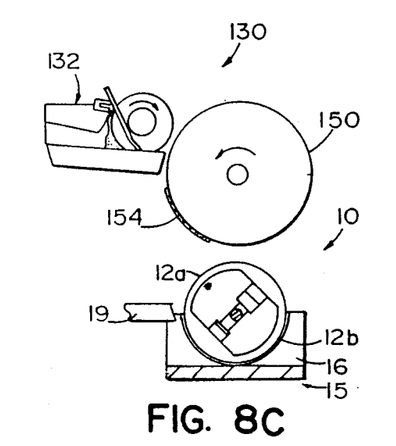

The first step in the operation of machine 130 involves the covering of plate 134 with lubricant from reservoir 136. The rotation of plate 134 through reservoir 136 fills matrix 138 with lubricant (FIG. 8A). Rotation of plate 134 past doctor blade 144 scrapes excess lubricant away from plate 134 to form a matrix lubricant layer 154 having a constant depth that corresponds to the configuration and size of the flat developed pattern of piston skirts 12a and 12b of piston 10 (FIG. 8B). Tampon 150, which rotates in contact with plate 134, but in the opposite direction, contacts matrix lubricant layer 154 causing matrix lubricant layer 154 to adhere to tampon 150 to form a lubricant layer 155 (FIG. 8C). Tampon 150 then rotates tampon lubricant layer 154 into position for transfer to piston 10.

Figure 8D:
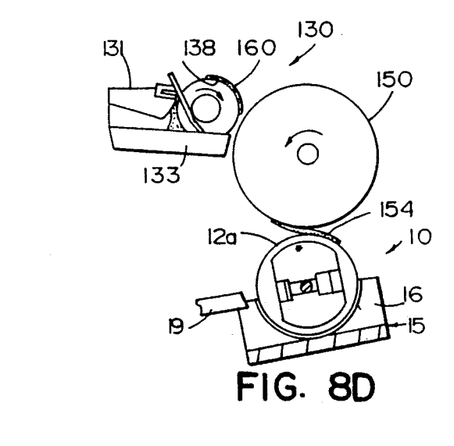

During the rotation of plate 134 and tampon 150 and the transfer of matrix lubricant layer 154 to tampon 150, the movement of support lever 19 moves support mechanism 15 and piston 10 into contact with tampon 150. The rotation of plate 134 and tampon 150 are in timed sequence with the movement of piston 10 by support lever 19 to allow the precise transfer of tampon lubricant layer 154 from tampon 150 to piston skirt 12a to form a first lubricant film coating 154 (FIG. 8D). Following the formation of first lubricant film coating 154, a second movement by support lever 19 retracts piston 10 from contact with tampon 150.

Figure 8E:
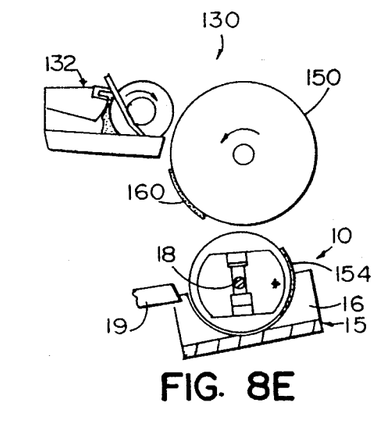

While matrix lubricant layer 154 is being transferred to tampon 150, plate 134 rotates through reservoir 136 again and covers plate 134 with lubricant (FIG. 8C). Doctor blade 144 then scrapes excess lubricant away from plate 134 again to form a second matrix lubricant layer 160 having a constant depth that corresponds to the configuration and size of the flat developed pattern of piston skirts 12a and 12b of piston 10 (FIG. 8D). Tampon 150 contacts second matrix lubricant layer 160 causing second matrix lubricant layer 160 to adhere to tampon 150 (FIG. 8E). Tampon 150 then rotates second tampon lubricant layer 160 into position for application to piston 10.

Figure 8F:
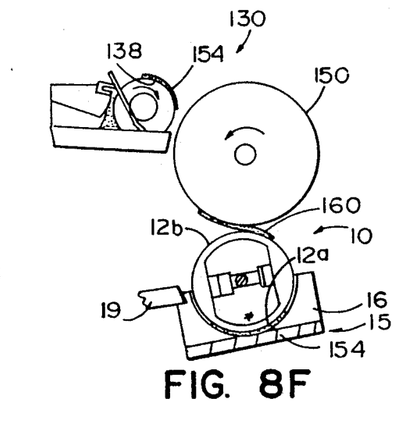

Movement of support lever 19 again moves support mechanism 15 and piston 10 into contact with tampon 150. The rotation of plate 134 and tampon 150 are in timed sequence with the movement of piston 10 by support lever 19 to allow the precise transfer of tampon lubricant layer 160 from tampon 150 to piston skirt 12b to form a second lubricant film coating 160 (FIG. 8F). Piston 10 has been rotated 180 degrees to provide access to piston skirt 12b. Following the formation of second lubricant film coating 160, support lever 19 again retracts piston 10 from contact with tampon 150. With the completion of the coating of piston 10 with lubricant, piston 10 is removed from piston support mechanism 15 and a new piston 10 is placed in position on piston support mechanism 15.

The benefits of forming a dry lubricant film on the skirts of a piston have long been recognized. Unfortunately, the previous methods of applying a wetted dispersion of the dry film lubricant by means of a spraying apparatus using a suitably dilute solution of the film lubricant are fraught with problems. Such methods require that all areas of the piston other than the piston skirt be masked or covered to prevent them from being contacted by the lubricant dispersion which is quite a laborious and costly task. Masking also does not always avoid coating undesirable portions of the piston which wastes lubricant and raises pollution concerns.

The present method disclosed herein provides for the precise and discriminate application of dry film lubricants to piston skirts. This precision in application provides for the manufacture of less costly dry lubricated pistons because the lubricant is applied only to the desired position. There is no problem with removing lubricant from areas of the piston where it is not wanted and there is also no requirement to remove the masking. Thus, dry lubricant pistons of the present invention have a lower likelihood for contamination with foreign matter (i.e., lubricant or masking material).

In the two embodiments of the invention disclosed herein, two variety of apparatus were disclosed for use in the method of applying the wetted dry lubricant to the piston. Both facilitate the rapid application of the dry lubricant to the pistons following the steps of changing the solvent of the lubricants to a more volatile solvent adjusting to a printable viscosity.

It should be understood that matrix 38 and matrix 138 each have a predetermined constant depth and dimensions in plates 34 and 134, respectively, which correspond to the configuration and size of the flat developed pattern of piston skirts 12a and 12b of piston 10. "Flat developed pattern" refers to the rectangular two dimensional area which is equivalent to the curved three dimensional area of the piston skirts 12a and 12b.

Changes and modifications in the specifically described embodiments can be carried out without departing from the principles of the invention which is intended to be limited only by the scope of the appended claims, as interpreted according to the principles of patent law, including the doctrine of equivalents.

The embodiments of the invention in which an exclusive property or privilege is claimed are defined as follows.

1. A method for dry film lubricant coating a defined area of a piston comprising the steps of:
   providing a wetted dry film lubricant material;
   applying said wetted dry film lubricant material to said defined area by means of a transfer pad coating process; and
   curing said wetted dry film lubricant material by applying heat to the piston with the wetted lubricant material applied thereto.

2. The method of claim 1, in which said wetted dry film lubricant material is a fluoropolymer lubricant dispersed in an organic resin and solvent.

3. The method of claim 1 in which the transfer pad coating process includes the steps of applying the wetted dry film lubricant material to a matrix having a configuration and size corresponding to the flat developed pattern of a curved surface area of said piston; and
   transferring said wetted dry film lubricant material from said matrix to said curved surface area.

4. The method of claim 3 in which the transfer of said wetted dry film lubricant material to said curved surface area is by a resilient tampon.

5. The method of claim 4 in which the resilient tampon is moved generally along linear paths including a first downward path to pick up said wetted lubricant material, a second path directed to a position over said defined curved surface area of said piston and a third path downward to said curved surface to deposit said lubricant on said defined surface area.

6. The method of claim 5 which said piston has two defined curved surface areas diametrically opposite one from the other on said piston and said tampon moves along said first, second and third paths to transfer said wetted lubricant material to one of said defined curved surface areas; and
   repeating said step of applying wetted dry film lubricant material to said matrix, after which said movement of said tampon along said first, second and third paths is repeated to transfer said wetted lubricant material to the other of said defined curved surface areas.

7. The method of claim 1 in which the transfer pad coating process includes the steps of applying the wetted dry film lubricant material to a curved matrix, said curved matrix having a configuration and size corresponding to the pattern of a curved surface area of said piston; and
   transferring said wetted dry film lubricant material from said curved matrix to said curved surface area.

8. The method of claim 7 in which the transfer of said wetted dry film lubricant material to said curved surface area is by a resilient tampon.

9. The method of claim 8 in which said tampon is cylindrical including the steps of rotating said tampon to pick up said wetted lubricant from said curved matrix and transferring said wetted lubricant to said curved surface area while said piston is rotating in timed sequence with the said rotation of said tampon.

10. The method of claim 9 in which said piston has two defined curved surface areas diametrically opposite one from the other on said piston and said tampon rotates to pick up said wetted lubricant material from said curved matrix to transfer said wetted lubricant material to one of said defined curved surface areas; and repeating said step of applying wetted dry film lubricant material to said matrix, after which said rotation of said tampon is repeated to transfer said wetted lubricant material to the other of said defined curved surface areas.

11. Apparatus for coating a defined curved surface area of piston with a wetted dry film lubricant comprising:

a transfer pad coating assembly including a matrix plate located in a first position and having a matrix of a configuration and size corresponding to the flat developed pattern of said curved surface area;

said matrix receiving a wetted dry film lubricant;

pick up and transfer means for picking up wetted dry film lubricant from said matrix and transferring it from said first position to a second position;

means for supporting a piston with said curved surface at said second position; and said pick up and transfer means including means for applying wetted dry film to said curved surface area at said second position.

12. The apparatus of claim 11 in which said piston includes first and second defined curved surface areas spaced one from the other on the circumference of said piston;

means for first positioning said first defined curved surface area in said second position;

means for secondly positioning said second defined curved area in said second position; and means for operating said transfer pad coating assembly while said first curved surface area is in said second position to thereby apply said wetted lubricant thereto; and means for operating said transfer pad coating assembly while said second curved surface area is in said second position to thereby apply said wetted lubricant thereto.

13. The apparatus of claim 11 in which a support means is provided for moving said pick up and transfer means along a linear path over said matrix or said piston support; and means for moving said pick up and transfer means in timed sequence to a position over said matrix, downwardly to pick up said lubricant, upwardly, then to a position over said piston support and then downwardly to apply said lubricant to a piston.

14. The apparatus of claim 12 in which a support means is provided for moving said pick up and transfer means for coating each of said first and curved surface areas, said pick up and transfer means is moved along a linear path over said matrix or said piston support; and means for moving said pick up and transfer means in timed sequence to a position over said matrix, downwardly to pick up said lubricant, upwardly, then to a position over said piston support and then downwardly to apply said lubricant to a piston.

15. The apparatus of claim 11 in which said transfer pad assembly includes a first rotating cylinder and a second rotating cylinder;

said first cylinder including said matrix receiving said lubricant;

said second cylinder including said pick up and transfer means for picking up said lubricant from said matrix; and means for supporting and rotating said piston in timed sequence with said rotation of said first and second cylinders whereby lubricant picked up by said second cylinder is transferred to said piston.

16. The apparatus of claim 13 in which said transfer pad assembly includes a first rotating cylinder and a second rotating cylinder;

said first cylinder including said matrix receiving said lubricant;

said second cylinder including said pick up and transfer means for picking up said lubricant from said matrix; and means for supporting and rotating said piston in timed sequence with said rotation of said first and second cylinders whereby lubricant is picked up at two circumferential positions on said second cylinder for transferring lubricant to said first and second defined areas.

* * * * *

UNITED STATES PATENT AND TRADEMARK OFFICE
CERTIFICATE OF CORRECTION

PATENT NO. : 5,266,142
DATED : November 30, 1993
INVENTOR(S) : Thomas J. Penrice It is certified that error appears in the above-indentified patent and that said Letters Patent is hereby corrected as shown below:

Column 8, line 37, claim 6:
    After "claim 5" insert --in--.

Signed and Sealed this

Twelfth Day of July, 1994

Attest:

BRUCE LEHMAN

Attesting Officer    Commissioner of Patents and Trademarks